United States Patent
Withers et al.

(10) Patent No.: US 8,680,469 B1
(45) Date of Patent: Mar. 25, 2014

(54) NANOCRYSTALLINE OPTICALLY-BASED NEUTRON IRRADIATION HISTORY SENSOR

(75) Inventors: Nathan J. Withers, Albuquerque, NM (US); Marek A. Osinski, Albuquerque, NM (US); Gennady A. Smolyakov, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 275 days.

(21) Appl. No.: 13/385,457

(22) Filed: Feb. 21, 2012

Related U.S. Application Data

(60) Provisional application No. 61/463,885, filed on Feb. 24, 2011.

(51) Int. Cl.
*G01T 3/08* (2006.01)

(52) U.S. Cl.
USPC .................................................. 250/370.05

(58) Field of Classification Search
USPC ............... 250/370.01–370.15, 269.1–369.8, 250/390.01–390.12
See application file for complete search history.

(56) References Cited

U.S. PATENT DOCUMENTS

| | | | | |
|---|---|---|---|---|
| 5,374,611 A | * | 12/1994 | Dabrowski et al. | 505/500 |
| 5,733,506 A | * | 3/1998 | Silver et al. | 422/90 |

OTHER PUBLICATIONS

M. Osinski et al., "Miniature Dysprosium-Based Monitors of Thermal Neutron Exposure History", NCMR Spring Techinal Review, Maui, Hawaii, Mar. 31, 2010.

* cited by examiner

*Primary Examiner* — Kiho Kim

(57) ABSTRACT

A neutron irradiation history sensor and detection method for detection of thermal neutrons exploit transmutation of $^{164}$Dy into $^{165}$Ho and $^{166}$Er and significant differences in optical properties of Dy, Ho, and Er in order to enable detection of relative fractions of Dy, Ho, and Er and thus the degree and timing of prior thermal neutron exposure that has occurred, providing a tamper-proof forensic record of the prior thermal neutron exposure. The irradiation history sensor and detection method advantageously employ Dy-containing nanocrytals (NCs) residing in a transparent host.

24 Claims, 7 Drawing Sheets

Table 1. Relevant data for isotopes with high thermal neutron cross sections and their evaluation for neutron detection

| Target isotope | Cross section | Natural abundance | Target half-life | Reaction | Reaction product | Product half-life | Final product |
|---|---|---|---|---|---|---|---|
| Xe-135 | 2665000 | 0% | 9.14 hours | (n,γ) | Xe-136 | Stable | |
| Gd-157 | 253000 | 24.80% | Stable | (n,γ) | Gd-158 | Stable | |
| Gd-155 | 60700 | 14.80% | Stable | (n,γ) | Gd-156 | Stable | |
| Sm-149 | 40520 | 13.80% | Stable | (n,γ) | Sm-150 | Stable | |
| Gd-153 | 22300 | 0% | 240 days | (n,γ) | Gd-154 | Stable | |
| Cd-113 | 20720 | 12.22% | Stable | (n,γ) | Cd-114 | Stable | |
| Rh-105 | 15840 | 0% | 35.4 hours | (n,γ) | Rh-106 | 30 s | Pd-106 |
| Sm-151 | 15140 | 0% | 90 years | (n,γ) | Sm-152 | Stable | |
| Eu-152 | 12790 | 0% | 13 years | (n,γ) | Eu-153 | Stable | |
| Eu-151 | 9184 | 47.80% | 1.7E18 y | (n,γ) | Eu-152 | 13 years | Sm-152 |
| He-3 | 5330 | 0.000137% | Stable | (n,p) | H-3 | 12.3 year | He-3 |
| B-10 | 3840 | 19.80% | Stable | (n,α) | Li-7 | Stable | |
| Eu-155 | 3760 | 0% | 4.7 years | (n,γ) | Eu-156 | 15.9 days | Gd-156 |
| Dy-165 | 3530 | 0% | 2.3 hrs | (n,γ) | Dy-166 | 81.6 hrs | Er-166 |
| Hg-196 | 3078 | 0.15% | Stable | (n,γ) | Hg-197 | 64 hrs | Au-197 |
| Os-184 | 3000 | 0.02% | Stable | (n,γ) | Os-185 | 94 days | Re-185 |
| Dy-164 | 2653 | 28.18% | Stable | (n,γ) | Dy-165 | 2.3 hrs | Ho-165 |
| Li-6 | 940 | 7.59% | Stable | (n,α) | H-3 | 12.3 yrs | He-3 |

FIG. 1A

NANOCRYSTALLINE OPTICALLY-BASED NEUTRON IRRADIATION HISTORY SENSOR

RELATED APPLICATION

This application claims benefits and priority of provisional application Ser. No. 61/463,885 filed Feb. 24, 2011, the entire disclosure of which is incorporated herein by reference.

FIELD OF THE INVENTION

This invention relates generally to neutron detection and, more specifically, to a method and sensor for detection of thermal neutrons which exploit optical detection of the transmutation of $^{164}$Dy to $^{165}$Ho and $^{166}$Er in response to neutron irradiation.

BACKGROUND OF THE INVENTION

Standard detectors of slow neutrons rely on the $^{10}$B(n,α), $^{6}$Li(n,α), or $^{3}$He(n,p) reactions. The thermal neutron cross-section for the $^{10}$B(n,α) reaction is 3840 barns, and the natural abundance of $^{10}$B is 19.8%. The most common detector based on the boron reaction is a $BF_3$ gas tube. Boron-loaded scintillators are also used, although they encounter the challenge of discriminating between gamma rays backgrounds and gamma rays due to neutrons. The thermal neutron cross-section for the $^{6}$Li(n,α) reaction is 940 barns, and the natural abundance of $^{6}$Li is only 7.4%. This requires enrichment of $^{6}$Li isotope, and increases the cost of the scintillators in which $^{6}$Li is embedded. The thermal neutron cross-section for the $^{3}$He(n,p) reaction is 5330 barns, but its natural abundance of only 0.0001% results in even higher cost than $^{6}$Li. A further problem with all of these neutron detection methods is the need for active electronics to detect the particle emitted from the nucleus that has absorbed a neutron, increasing size, cost, and danger of compromising the mission if used for clandestine activities.

In addition to the problems discussed above, some applications may benefit from the availability of miniaturized monitors of thermal neutron exposure, which are presently not available. The present invention fills in this need and provides novel dysprosium-based nanocrystalline detectors.

SUMMARY OF THE INVENTION

Embodiments of the present invention provide a neutron-detecting method and sensor which exploit the transmutation of $^{164}$Dy into $^{165}$Ho and $^{166}$Er in response to irradiation and which enable optical detection of the transmutation. In particular, these embodiments involve optically-enabled thermal neutron detection that relies on significant differences in optical properties of Dy, Ho, and Er that are not sensitive to a particular isotope, but change considerably from one element to another such that the relative fractions of Dy, Ho, and Er can be optically determined and provide a forensic record of prior thermal neutron exposure of the sensor.

A particular illustrative embodiment of the present invention provides a nanocrystalline-based neutron irradiation history sensor and detection method that employ Dy-containing nanocrystals (NCs) and that utilize the superior optical and mechanical properties of NCs compared to their bulk counterparts. For the purposes of this invention, the terms nanocrystals and nanoparticles are used interchangeably, as crystallinity of the detector is not essential for its operation. It should be emphasized that the present invention can also be practiced using bulk Dy-containing materials. Suitable Dy-containing nanoparticles include, but are not limited to, dysprosium halides, dysprosium oxides, dysprosium aluminum garnets, and other compounds. A particular advantage of the nanocrystalline neutron irradiation history sensor for optical detection arises from integration or incorporation of the NCs into a transparent polymer or ceramic host matrix without causing optical scattering, wherein the host matrix can serve the dual functions of making the neutron sensor mechanically robust as well as moderating incoming neutrons, thus improving the probability of interaction and detection sensitivity. The significant differences in optical properties of Dy, Ho, and Er allow optical, extending into mid-infrared, spectral analysis of the sensor to determine its thermal neutron exposure history. Practice of the present invention is advantageous in that the relative fractions of Dy, Ho, and Er can provide a tamper-proof record of the sensor's prior thermal neutron exposure that cannot be manipulated. Practice of the present invention is further advantageous in that naturally-occurring Dy material can be used without enrichment of $^{164}$Dy isotope as a result of the high natural abundance of $^{164}$Dy together with the chain of isotope conversion $^{161}$Dy→$^{162}$Dy→$^{163}$Dy→$^{164}$Dy thermal neutron irradiation that permits the use of 97.6% of naturally-occurring dysprosium. The present invention also envisions enrichment of $^{164}$Dy isotope for certain applications that may require higher sensitivity.

Further advantages and details of the present invention will become more apparent from the following detailed description taken with the following drawings.

BRIEF DESCRIPTION OF THE DRAWINGS

FIG. 1A shows Table 1 that lists candidate materials for thermal neutron detection.

DETAILED DESCRIPTION

As described herein, the preferred embodiments of the present invention involve a method and sensor of optical detection of thermal neutrons as explained in detail below. Below are the details of certain exemplary embodiments, however, this does not limit other embodiments from using other suitable methods or materials. Those of skill in the art will appreciate that the following description is related to preferred and/or example embodiments of the present invention. Certain embodiments of the present invention are defined exclusively within the appended claims.

Figure 1:
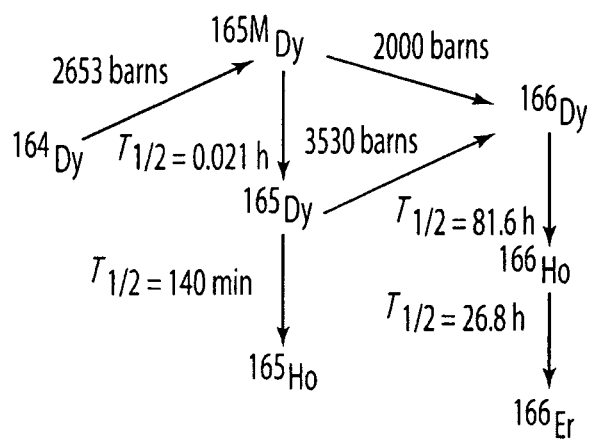
FIG. 1 shows decay paths and lifetimes for $^{165m}$Dy after neutron interaction.

Embodiments of the present invention provide for detection of thermal neutrons which exploits transmutation of $^{164}Dy$ into $^{165}Ho$ and $^{166}Er$, illustrated in FIG. 1, and retrieval of data stored in the sensor by optical, extending into mid-infrared, spectral analysis thereof (or other suitable techniques, such as X-ray fluorescence, atomic absorption spectroscopy, mass spectrometry, etc.) to determine relative fractions of Dy, Ho, and Er from the prior transmutation. The high neutron capture cross-section (~2650 barns) combined with high natural abundance (28.2%) of $^{164}Dy$ make it a very likely candidate for low-cost neutron detection. As result of neutron capture, $^{164}Dy$ forms a metastable isomer $^{165m}Dy$, which can either relax to $^{165}Dy$, or upon the capture of a second neutron (with the cross-section of 2000 barns) can be converted into $^{166}Dy$. $^{165}Dy$ itself has two decay routes, first with the half-life of 140 min to a stable isotope of holmium $^{165}Ho$, or upon the capture of a second neutron (with the cross-section of 3530 barns) to $^{166}Dy$. The latter has a half-life of 81.6 hours, producing a radioactive daughter $^{166}Ho$, which then decays with the half-life of 26.8 hours into a stable isotope of erbium $^{166}Er$.

Embodiments of the present invention provide a method and sensor that enables optical detection of prior thermal neutron exposure based on the transmutation of $^{164}Dy$ into $^{165}Ho$ and $^{166}Er$ by virtue of optical characterization of the Dy-containing material for maximum spectral differentiation among the three lanthanides involved. These embodiments in effect provide optically-enabled neutron detection that relies on significant differences in optical properties of Dy, Ho, and Er that are not sensitive to a particular isotope, but change considerably from one element to another such that the relative fractions of Dy, Ho, and Er present can be optically determined and provide a forensic record of the prior neutron exposure of the sensor both in the degree of exposure and timing of exposure. Optical extending into mid-infrared (e.g. extending to about 15 microns wavelength) spectral analysis techniques that can be used to retrieve the sensor data (relative fractions of Dy, Ho, and Er) include, but are not limited to, spectrofluorometry, absorption, and Fourier transform infrared spectroscopy (FTIR).

Thin foils of metallic dysprosium have been in use for slow neutron radiography for a long time, where beta particle emission was used as means of quantifying the exposure. In certain embodiments, instead of observing the decay events, the same information can be retrieved by optical interrogation of the transmuted elements. This allows a completely passive detector that can be examined days or even months after exposure for the presence of neutrons.

The present invention should not be confused with the long-established luminescence dosimetry, which relies on electronic traps that are filled in during exposure, and later interrogated by either increasing the temperature (thermoluminescent dosimeters—TLDs) or using a strong light source (optically stimulated luminescence—OSL). Dysprosium activators have been used in calcium sulfide and calcium fluoride TLDs. The TLDs are sensitive to both neutrons and gamma rays, while embodiments of the present invention are completely insensitive to gamma irradiation and will provide a very important capability of eliminating false alarms associated for example with naturally occurring, innocuous gamma sources. In order to achieve this level of functionality on TLDs, pairs of different detectors have to be used, with one practically insensitive to neutrons, and another one with higher neutron sensitivity. This limits the accuracy of the measurements and makes their analysis more complicated. Another important advantage of embodiments of the present invention over TLDs is the tamper-proof character of the information stored after exposure. In contrast to TLDs, whose activated trap states can be easily emptied by heating the dosimeter (note that OSL is even more vulnerable from this point of view, as information can be erased simply by illumination), the relative fractions of Dy, Ho, and Er after exposure cannot be manipulated. Thus, the sensor pursuant to the present invention can be useful if forensic evidence needs to be collected in situations where any suspicion of tampering would need to be eliminated. If desired, unique signatures can be easily introduced into certain sensor embodiments by adding neutron-insensitive but optically active impurities such as cerium, or mixing the NCs with combinations of other nanocrystals made of materials with low thermal neutron capture cross-sections, such as $La_xCe_{1-x}F_3$ or $La_{2x}Ce_{2(1-x)}O_3$, that could provide optical encoding of individual sensors.

Although the present invention envisions using bulk Dy-containing material, such as dysprosium halides, dysprosium oxides, dysprosium aluminum garnets and other compounds, applicants believe the use of Dy-containing NCs (nanoparticles) is preferred in that it offers more advantages due to its significantly lower cost, relative ease of colloidal synthesis of high quality NCs with controlled composition, and superior optical and mechanical properties of NCs compared to their bulk counterparts. One particular advantage of NCs for neutron detection is that they can be integrated into a transparent polymer or ceramic host without causing optical scattering, and the host can serve the dual functions of making the neutron detector mechanically robust as well as moderating incoming neutrons, improving the probability of interaction and detection sensitivity. This illustrative embodiment is described below in connection with FIG. 7.

In order to demonstrate that selection of $^{164}Dy$ offers the best combination of high thermal neutron cross-section, high natural abundance (and hence low cost), and relatively rapid conversion into a chemically compatible stable isotope of a different element than the original target, Table 1 of FIG. 1A lists all possible candidate targets with thermal neutron capture cross-sections higher than that of $^{164}Dy$. Only the isotopes that split into smaller fragments as a result of neutron capture have been excluded from Table 1, as high energy of the fission products would cause them to leave the NC, with considerable damage inflicted upon the NC itself, which would make any quantitative analysis virtually impossible. All cases when the final product is an isotope of the same element as the original target are not suitable for simple optical interrogation and would require a much more sophisticated isotope shift analysis. Equally not suitable are targets with very low natural abundance, which are eliminated from consideration due to their high cost, and targets with short half-lives that are not suitable for long-term monitoring. Also excluded from consideration are the reaction products that are significantly different in their chemical properties compared to the original target element, as their behavior within the NCs, especially at large concentrations, would be problematic. For example, transmutation of $^6$Li to $^3$H could easily lead to decomposition of the NCs. In addition, emission of highly energetic protons or α particles would likely impart a significant crystalline damage, which would reduce the efficiency of optical emission from the NCs. In contrast, all products of $^{164}$Dy reactions are lanthanides, fully compatible with the crystalline structure of the original NC. High natural abundance of 28% for $^{164}$Dy requires no isotopic separation to measure changes in sensor's optical properties, using inexpensive equipment. For increased sensitivity at low neutron flux applications, NCs enriched with $^{164}$Dy can also be used. This can be accomplished by using precursors enriched with $^{164}$Dy in the colloidal synthesis. Even though its thermal neutron capture cross-section is significantly lower than that of $^{164}$Dy, $^6$Li has been included in Table 1 for comparison purposes, as it is commonly used in neutron detection.

Note that $^{165}$Dy has been included in Table 1 for completeness, but in certain embodiments it will only appear as a product of neutron capture by $^{164}$Dy. It will, however, play an important role in reconstruction of neutron exposure history.

As follows from Table 1, $^{164}$Dy is the unequivocally best choice for an isotope that would possess all of the properties needed for embodiments of the present invention. There is ample experimental evidence that, when inserted in various nanosized hosts, Dy, Ho, and Er emit light in both visible and near infrared spectral regions, and their emission lines can be easily differentiated.

All other isotopes with larger thermal neutron cross sections have various problems that make them unacceptable for this application. $^{135}$Xe is the isotope with the highest cross-section at 2,665,000 barns, but has a half-life of only 9.14 hours, much too short to be useful in a monitoring detector. $^{157}$Gd has the highest cross section among all stable elements at 253,000 barns, but upon absorbing a neutron it turns into another stable isotope of gadolinium, $^{158}$Gd, making it very difficult to optically distinguish from the original target. While in principle a hyperfine structure of optical spectra can provide information about various isotopes of the same element, those measurements require very high spectral resolution to detect mass shifts of the order of 100 MHz. In contrast, a simple visual inspection may be sufficient to determine a high level of neutron exposure using the concept described in this invention. The same arguments eliminate from consideration most of the other isotopes from the first column in Table 1 that convert into a stable or long lifetime isotope of the same element as the original target. For example, $^{151}$Eu has the highest natural abundance of 47.8% among all neutron captors listed in Table 1, with a relatively high-cross section of 9184 barns, but it transmutes into $^{152}$Eu that has a half-life of 13 years, too long for practical purposes.

$^{10}$B provides a combination of high thermal neutron cross-section and high natural abundance very similar to that of $^{164}$Dy, and cannot be upfront completely excluded from the list of possible candidate targets. However, the product of $^{10}$B decay is $^7$Li, which does have significantly different chemical properties from boron, and at high concentrations would likely cause crystalline defects.

Applicants estimate the projected sensitivity of embodiments based on the currently existing technical capabilities to detect the smallest amounts of optically active substances. According to manufacturer's specifications, the Horiba Jobin Yvon FluoroLog-3 spectrofluorometer can detect 50-femtomolar concentration of fluorescein ($C_{20}H_{12}O_5$), which translates into the ability to detect $50 \times 10^{-15} N_A = 3.011 \times 10^7$ molecules/cm$^3$ (where $N_A$ is the Avogadro constant) of strongly luminescent fluorescein in solution. In terms of the smallest possible detectable $^{165}$Ho concentration, applicants accounted for the difference in the quantum yield of ~79% for fluorescein and a realistic target for the quantum yield of NCs containing small concentrations of lanthanides. Very high values of quantum efficiencies have been reported for some lanthanide compounds, for example 95% for LaF$_3$:Nd and 90% for Lu$_2$O$_3$:Eu, although it should be noted that the efficiencies do vary considerably with dopant concentration and the host medium. In making applicants' estimates of ultimate performance of neutron detector, applicants assume a somewhat lower value of 30% for the quantum efficiency. With this assumption, projection of the fluorescein sensitivity to $^{165}$Ho gives the minimum detectable concentrations of $^{165}$Ho as ~$8 \times 10^7$ atoms/cm$^3$. This estimate holds for $^{166}$Er as well. Thus, for nanocrystalline compounds of Dy with high luminescence efficiency when doped with small concentrations of Ho or Dy, the minimum dose for neutron detection using certain embodiments is roughly projected to be of the order of ~$8 \times 10^7$ neutrons/cm$^3$. Transparency of the host material to $^{165}$Ho- or $^{166}$Er-related optical emission is implied.

In order to demonstrate the potential of Dy-containing NCs as thermal neutron detectors, applicants have evaluated the ultimate performance of the NCs in the limit of pure $^{164}$Dy. The kinetics of nuclear reactions (see FIG. 1) resulting from exposure of $^{164}$Dy to a constant thermal neutron flux $\Phi$ (in n/cm$^2$-s) can be described by the following set of equations:

$$dC_{164Dy}/dt = -\sigma_{164Dy}\Phi C_{164Dy}$$

$$dC_{165mDy}/dt = \sigma_{164Dy}\Phi C_{164Dy} - \sigma_{165mDy}\Phi C_{165mDy} - \lambda_{165mDy}C_{165mDy}$$

$$dC_{165Dy}/dt = -\sigma_{165Dy}\Phi C_{165Dy} + \lambda_{165mDy}C_{165mDy} - \lambda_{165Dy}C_{165Dy}$$

$$dC_{166Dy} = dt = \sigma_{165mDy}\Phi C_{165mDy} + \sigma_{165Dy}\Phi C_{165Dy} - \lambda_{166Dy}C_{166Dy}$$

$$dC_{165Ho}/dt = \lambda_{165Dy}C_{165Dy}$$

$$dC_{166Ho} = dt = \lambda_{166Dy}C_{166Dy} - \lambda_{166Ho}C^{166Ho}$$

$$dC_{166Er}/dt = \lambda_{166Ho}C_{166Ho} \qquad (1)$$

where $C_{Xi}$ denotes the concentration (in cm$^{-3}$) of the corresponding isotope $X_i$ (i=1 ..., 7), while $\sigma_{Xi}$ and $\lambda_{Xi}$ stand for the thermal neutron capture cross section (in cm$^2$) and decay rate (in s$^{-1}$) of that isotope. The decay constants are related to the corresponding half-life times $T_{1/2}$ of isotopes shown in FIG. 1 as $\lambda = \ln 2/T_{1/2}$.

The system of homogeneous linear differential equations with constant coefficients (1) allows for analytical solution, however it leads to a characteristic equation with degenerate roots. The analytical solution procedure can be easily simplified by adding formal decay terms in equations governing $^{165}$Ho and $^{166}$Er concentrations, which eliminates degeneracy. The decay rates for these two isotopes are in the end set to zero when numerical calculations are performed. The general solution of that modified system of equations will then be written as $$C_{Xi}(t) = C_{i1}e^{r_1 t} + C_{i2}e^{r_2 t} + C_{i3}e^{r_3 t} + C_{i4}e^{r_4 t} + C_{i5}e^{r_5 t} + C_{i6}e^{r_6 t} + C_{i7}e^{r_7 t}, i=1,\ldots,7, \qquad (2)$$

where exponents $r_1, r_2, r_3, r_4, r_5, r_6$, and $r_7$ are found as roots of the characteristic equation of the non-degenerate version of equations (1), and the unknown coefficients $C_{ik}$ are determined from the initial conditions.

Applicants have solved kinetic equations (1) analytically, and then evaluated numerically a number of cases of interest using the following parameters: initial concentration of pure $^{164}$Dy $C_{164Dy}(0)=0.314\times10^{23}$ cm$^{-3}$, $\lambda_{165mDy}=9.168613\times10^{-3}$ s$^{-1}$, $\lambda_{165Dy}=8.2518\times10^{-5}$ s$^{-1}$, $\lambda_{166Dy}=2.36\times10^{-6}$ s$^{-1}$, $\lambda_{166Ho}=7.184\times10^{-6}$ s$^{-1}$, $\sigma_{164Dy}=2653\times10^{-24}$ cm$^2$, $\sigma_{165mDy}=2000\times10^{-24}$ cm$^2$, $\sigma_{165Dy}=3530\times10^{-24}$ cm$^2$, and varying thermal neutron flux $\Phi$.

Figure 2A:
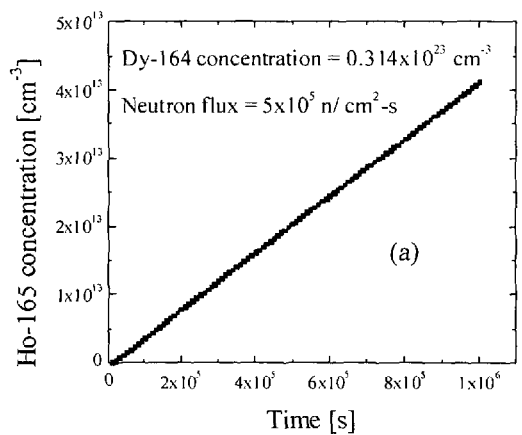
FIGS. 2a and 2b show calculated concentrations of $^{165}$Ho, FIG. 2a and of $^{166}$Er, FIG. 2b, produced in a sample of $^{164}$Dy as a result of exposure to thermal neutrons at a moderate flux of 5×10$^5$ n/cm$^2$-s.
Figure 2B:
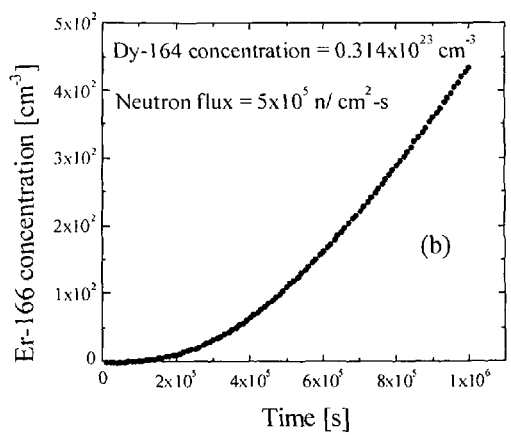
Figure 3A:
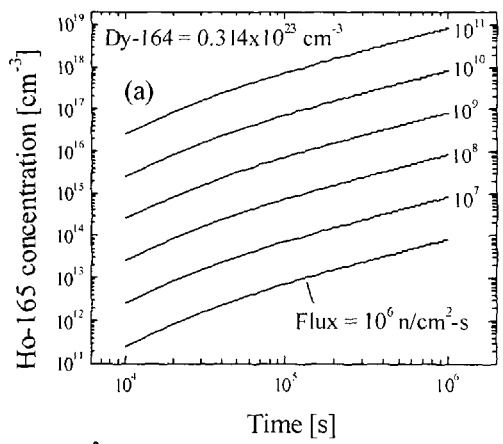
FIGS. 3a and 3b show calculated concentrations of $^{165}$Ho, FIG. 3a, and of $^{166}$Er, FIG. 3b, produced in a sample of $^{164}$Dy as a result of exposure to thermal neutrons, calculated for various thermal neutron fluxes. Broken line represents the optical detectability limit.
Figure 3B:
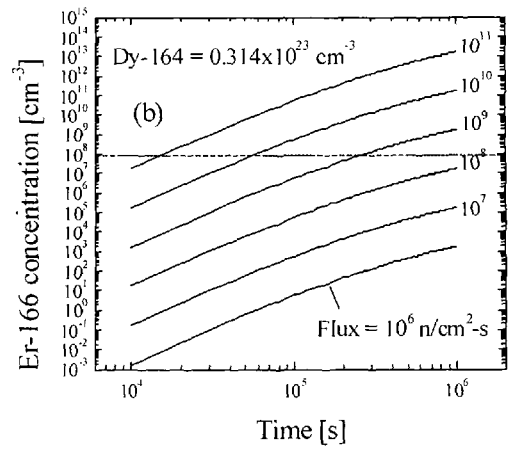
Figure 4A:
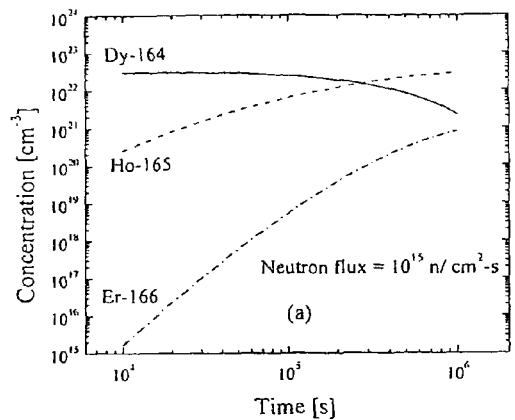
FIGS. 4a and 4b show concentrations of $^{164}$Dy, $^{165}$Ho, and $^{166}$Er versus time of exposure to thermal neutrons, calculated for very high thermal neutron fluxes of 10$^{15}$ n/cm$^2$-s, FIGS. 4a, and 10$^{16}$ n/cm$^2$-s, FIG. 4b.
Figure 4B:
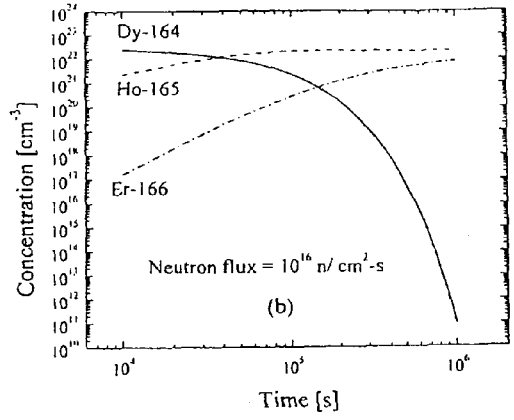

Results for moderate neutron flux conditions ($\Phi=5\times10^5$ n/cm$^2$-s) are presented in FIGS. 2a and 2b in terms of $^{165}$Ho and $^{166}$Er concentrations, respectively, that would be produced in the $^{164}$Dy sample after certain period of exposure to thermal neutrons. The calculations were carried out for up to $10^6$ seconds of exposure (corresponding to a typical duration of a transoceanic voyage). As can be seen from FIG. 2(a), the final $^{165}$Ho concentration is well within the range that would be easily detectable by optical means. At the same time, $^{166}$Er is produced in tiny amounts that would not be optically detectable. In order to estimate the range for thermal neutron flux that would be optically detectable through $^{166}$Er production, applicants performed the calculations for higher thermal neutron fluxes (FIGS. 3(a), (b)). As follows from FIG. 3(b), at very high neutron fluxes of ~$10^{11}$ n/cm$^2$-s, typical for conditions inside nuclear reactors, conversion of $^{164Dy}$ into $^{166}$Er becomes detectable after ~15,000 s of exposure. Further increase in the thermal neutron flux assumed in the calculations (FIG. 4) allowed applicants to estimate the level of the neutron flux that would result in saturation of the proposed detection scheme as ~$10^{16}$ n/cm$^2$-s.

However, higher fluxes of up to ~$5\times10^{17}$ n/cm$^2$-s and up to ~$3\times10^{19}$ n/cm$^2$-s can be measured if the exposure time is reduced to 1 h and 1 min, respectively.

Figure 5:
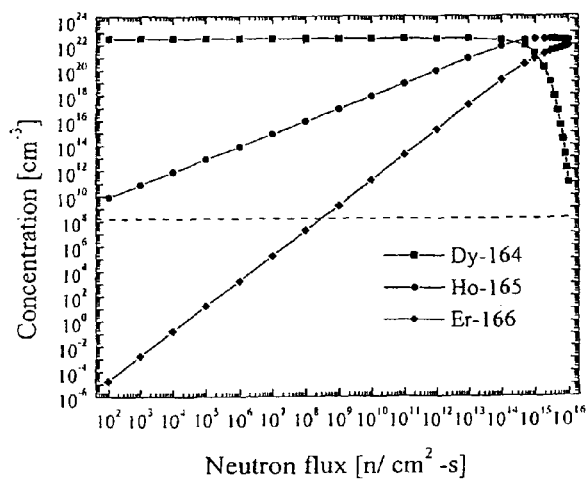
FIG. 5 shows concentrations of $^{164}$Dy, $^{165}$Ho, and $^{166}$Er after 10$^6$ s of exposure to thermal neutrons as a function of neutron flux. Broken line represents the optical detectability limit.

Detection of both $^{165}$Ho and $^{166}$Er is necessary to enable full tracing of exposure history, including the information about neutron flux and duration of the exposure. FIG. 5 shows concentrations of $^{164}$Dy, $^{165}$Ho, and $^{166}$Er after $10^6$ s of exposure to thermal neutrons calculated as function of neutron flux. The dashed line indicates the estimated optical detectability limit of $8\times10^7$ cm$^{-3}$. Detection of both $^{165}$Ho and $^{166}$Er becomes possible for fluxes exceeding ~$2\times10^8$ n/cm$^2$-s.

Figure 6:
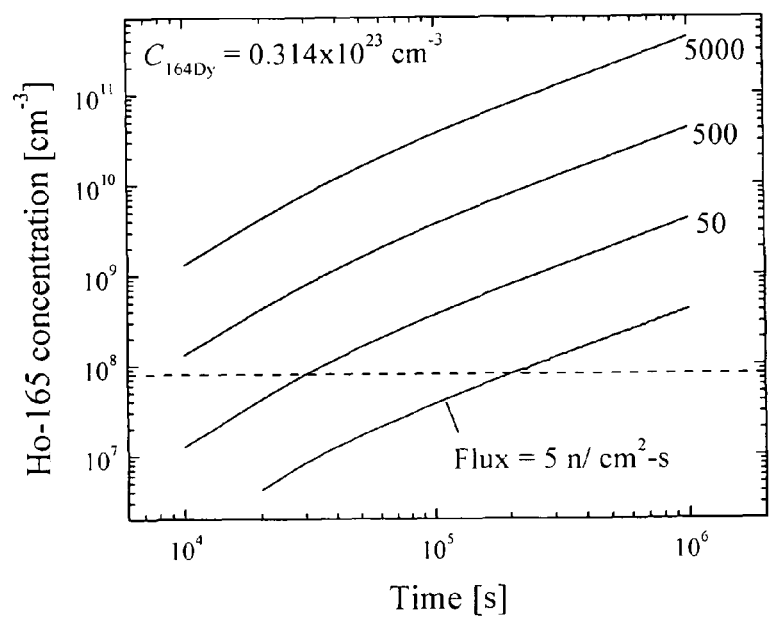
FIG. 6 shows calculated $^{165}$Ho concentrations produced in the $^{164}$Dy sample as a result of exposure to very low thermal neutron fluxes. Broken line represents the optical detectability limit.

FIG. 6 shows calculated concentrations of $^{165}$Ho in the limit of very low neutron fluxes. According to certain embodiments, a thermal neutron flux of 250 n/cm$^2$-s can produce ~$2.06\times10^{10}$ atoms/cm$^3$ of $^{165}$Ho after $10^6$ s (~11 days) of exposure of pure $^{164}$Dy, which is significantly above the sensitivity limit for assumed 30% quantum efficiency of $^{165}$Ho. Another source of thermal neutrons, a nuclear reactor generating ~$10^8$ n cm$^{-2}$s$^{-1}$, can produce $^{165}$Ho concentrations many orders of magnitude above the sensitivity limit (see FIG. 5). Neutron detection in the vicinity of these neutron sources is therefore possible.

Other performance parameters, such as dose resolution and error, are more difficult to predict, as they will depend on particular implementation of the optical detection system, operational range, and so on. In the case of photoluminescence (PL) detection, linearity between $^{165}$Ho ($^{166}$Er) (Er) concentrations and detected PL intensity will be of crucial importance for the detection system. The range of $^{165}$Ho ($^{166}$Er) concentrations for linear response of embodiments can be determined experimentally.

The potential of the certain embodiments to detect low activity neutron sources can be evaluated using an example considered in other publications. A sphere of 5 kg of δ-plutonium (radius 4.22 cm) was considered as an example of an illicit source, with the source strength of $4.5\times10^5$ n/s, which corresponds to 10% $^{240}$Pu (a compromise between nominal "weapons grade" and "reactor grade" compositions). The neutron flux generated by such a source is estimated as ~2,010 n/cm$^{-2}$s$^{-1}$ directly at the surface of the 240Pu sphere and dropping down to ~3.6 n/cm$^2$-s at 1 m distance from the source. As follows from FIG. 6, detection of such low activity neutron sources with certain embodiments would still be possible through $^{165}$Ho production, provided the detector is not too far from the source.

Higher energy neutron fluxes can be detected if the proposed neutron detector is used in combination with neutron moderator materials such as polyethylene. Direct detection of fast neutrons without moderation is in principle possible, but the probability of detection is significantly lower due to a much smaller cross-section for fast neutron interactions.

Figure 7:
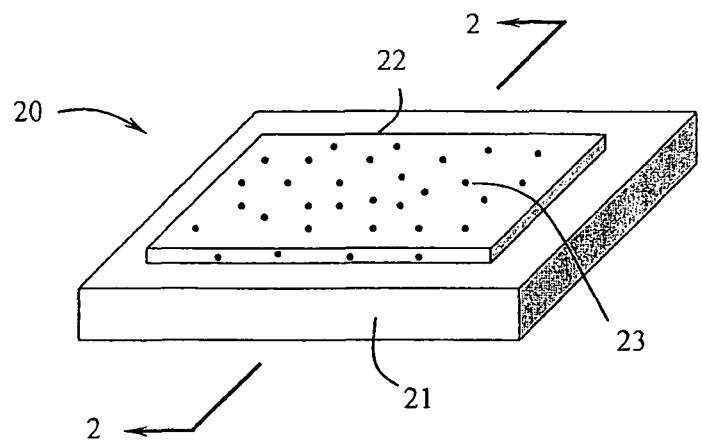
FIG. 7 shows a perspective view of a preferred embodiment of thermal neutron detector according to this invention.
Figure 8:
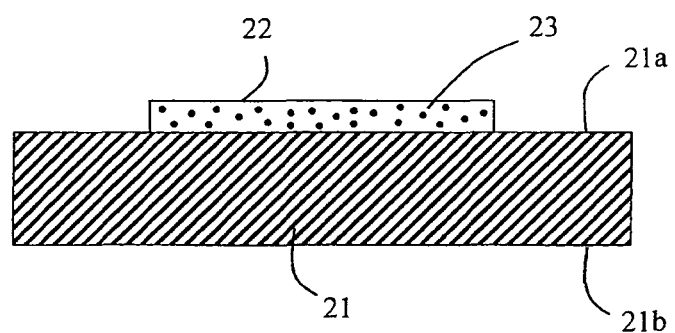
FIG. 8 shows an enlarged side cross sectional view of the thermal-neutron detector of FIG. 7.

FIG. 7 shows a preferred illustrative embodiment of thermal-neutron sensor 20 according to this invention. Sensor or detector comprises a substrate 21 and a transparent polymer layer 22 with Dy-containing NCs dispersed in the layer 22 (matrix), which is connected to the substrate. FIG. 8 illustrates that the polymer layer 22 comprises Dy-containing NCs 23 uniformly dispersed in it. The polymer layer can have a thickness in the range of 100 microns to 2 mm for purposes of illustration and not limitation. Substrate 21 can be made from a variety of materials, such as transparent glasses. A transparent substrate material allows the level of photoluminescent emission of the NCs to be read either from the polymer layer side 21a or from the back side 21b. The substrate 21 and polymer layer 22 can have dimensions, such as 5×5 mm for purposes of illustration and not limitation, to provide a miniature thermal-neutron sensor.

In another illustrative embodiment of the present invention, the Dy-containing NCs can be dispersed in a three dimensional polymer block to form a miniature thermal-neutron sensor, such as one having dimensions of only 5×5×5 mm.

In yet another illustrative embodiment of the present invention, the Dy-containing NCs can be dispersed in a crystalline or ceramic host matrix transparent from ultraviolet (UV) to infrared (IR), such as potassium bromide (KBr), and barium fluoride (BaF$_2$). KBr is transparent from the near UV to long IR wavelengths (0.25-25 μm). BaF$_2$ is transparent from 150 nm to 11.5 μm.

As mentioned above, $^{164}$Dy has a very high natural abundance of ~28.2%. In addition, other stable isotopes of Dy with significant natural abundance will undergo conversion to $^{164}$Dy under thermal neutron irradiation. For example, $^{161}$Dy (natural abundance of ~18.9%) will convert into $^{162}$Dy (which in itself has a natural abundance of ~25.5%), with thermal neutron capture cross section of ~600 barns. $^{162}$Dy will then convert into $^{163}$Dy (natural abundance of ~25%) with thermal neutron capture cross section of ~194 barns. Finally, Dy will convert into $^{164}$Dy with thermal neutron capture cross section of ~124 barns. The high natural abundance of $^{164}$Dy together with the described chain of isotope conversion $^{161}$Dy→$^{162}$Dy→$^{163}$Dy→$^{164}$Dy under thermal neutron irradiation permits the use of 97.6% of naturally occurring dysprosium. Thus, synthesis of Dy-containing NCs can be performed using naturally occurring Dy-containing compounds without any enrichment of $^{164}$Dy. Enrichment of $^{164}$Dy isotope, however, is still of interest for applications that may require high sensitivity. The present invention envisions the use of any Dy-containing nanomaterial, including pure metallic DyNCs. Typically, Dy-containing NCs can be obtained by means of appropriate colloidal synthesis methods. For example, dysprosium halide (in particular, fluoride, bromide, and iodide), dysprosium oxide Dy$_2$O$_3$, and dysprosium aluminum garnet Dy$_3$Al$_2$(AlO$_4$)$_3$NCs can be synthesized and used for detection of thermal neutron irradiation. Other forms of nanomaterials can be envisaged, for example thin foils, etc.

Example 1

A. Synthesis of Dysprosium Oxide $Dy_2O_3$ Nanocrystals

In a three-neck flask, 2 mmol of dysprosium (III) nitrate hexahydrate are added to 40 mL of diethylene glycol (DEG), and after that 6 mmol of NaOH is added to the flask. The mixture is then refluxed open to air at 210° C. for 30 minutes. As the solution is cooled, 1.6 mmol of oleic acid mixed with 20 mL of DEG are added to the flask. The obtained nanocrystals are then washed by centrifuging 5 mL of the solution in 10 mL of toluene 3 times and collecting the toluene mixture as the product.

Figure 9:
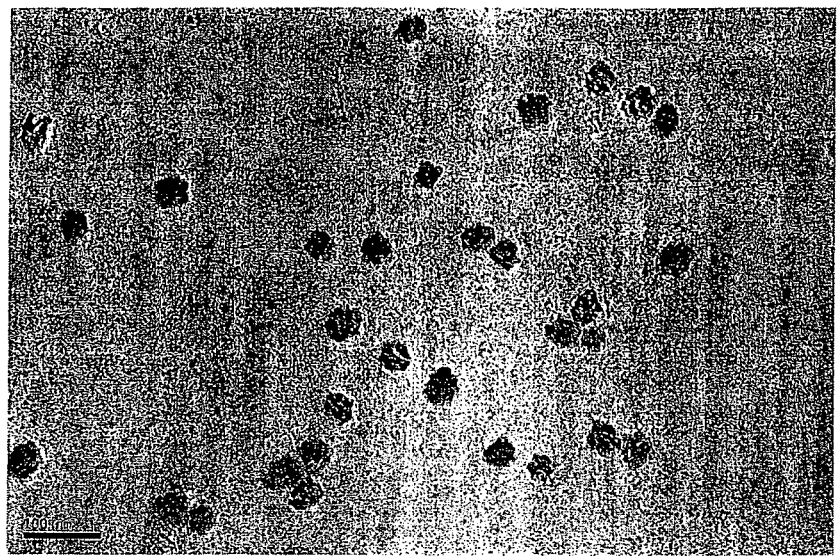
FIG. 9 shows a bright-field TEM (transmission electron microscope) image of $Dy_2O_3$ colloidal nanocrystals (nanoparticles).

B. Characterization of Dysprosium Oxide $Dy_2O_3$ Nanocrystals $Dy_2O_3$NCs are obtained as spherical nanoparticles 25 to 50 nm in diameter shown in the bright-field TEM image of FIG. 9.

Example 2

A. Synthesis Of Dysprosium Fluoride $DyF_3$ Nanocrystals

In an argon-filled glovebox, a mixture of 35 mL of anhydrous methanol with 3 mmol of ammonium fluoride is prepared in a three-neck flask, and the flask is sealed before removal. Then inside the glovebox, a 20 mL syringe is prepared, containing 2 mL of anhydrous methanol mixed with 1.3 mmol of dysprosium (III) nitrate hexahydrate. The flask is set up on the Schlenk line and a flow of argon in the flask is started. Next, the flask is brought to 60° C. and the solution from the syringe is added to the flask. The mixture in the flask is allowed to soak for 2 hours, and then 0.50 mL of oleic acid is added to the flask. The solution is centrifuged twice at 10,000 rpm in methanol. The obtained nanocrystals are collected by removing the supernatant and by dispersing it in 20 mL of toluene.

Figure 10:
FIG. 10 shows a bright field TEM (transmission electron microscope) image of $DyF_3$ colloidal nanocrystals (nanoparticles).

B. Characterization of Dysprosium Fluoride $DyF_3$ Nanocrystals $DyF_3$NCs are obtained as nanorods ~100 nm to 200 nm long and ~40 nm to 50 nm in diameter shown in the bright-field TEM image of FIG. 10.

Polymers

A variety of polymer materials can be used as host material or matrix for uniform dispersion of Dy-containing NCs, such as poly(methyl methacrylate) (PMMA), poly(n-hexyl methacrylate) (PHMA), polystyrene (PS) and polyvinyltoluene (PVT). A typical procedure involves free radical polymerization of the corresponding monomer containing uniformly dispersed NC powder.

Polymerization Procedure

The monomer is distilled to remove any kind of inhibitor sometimes present in the monomer. The distilled monomer is put into a 1-neck flask, air is removed from the flask by using vacuum, and the flask is refilled with nitrogen. In the glovebox, 0.1 wt % azobisisobutryonitrile (AIBN) is added as polymerization initiator to the flask. In the glovebox, the nanocrystal powder is added to the solution in the flask, and the solution is stirred until it is homogeneous. Using a water bath, the solution is pre-polymerized in the flask at 90° C. for 20 minutes. In the glovebox, using a pipette, the solution is transferred from the flask to a 7 mL aliquot vial, and the vial is capped. Polymerization of the solution is completed by heating the vial in the oven at 60° C. for 20 hours.

Certain embodiments can offer very attractive new approaches to monitoring of special nuclear materials (SNMs), with an immediate recognition of very-high-level exposure by simple visual inspection, and with a possibility of tracing back the original time of exposure. This forensic capability may prove very valuable in determining, for example, the port of entry of SNM onto a vessel that may have stopped at various ports in its route to the point of interception. A small size of the nanocrystalline sensor will make it possible to keep the cost of the sensor low, and, if desired, to easily conceal it as a piece of transparent plastic. Neutron sensors pursuant to the invention can be employed for covert cargo monitoring on a vehicle (ship, airplane, truck, or other vehicle), and clandestine facility investigation. Other possible applications of the present invention include:

Neutron radiation monitoring devices in the vicinity of reactors

Miniaturized neutron detectors mounted on mobile robotic or other remotely controlled platforms (such as radio-controlled insects)

Inexpensive portable neutron dosimeters, with an easy, fast visual readout in case of very high exposure Neutron radiography, with Dy films replaced by sheets of plastic embedded with NCs Clandestine monitoring of suspected nuclear proliferation facilities Embodiments of the present invention are expected to contribute to many scientific and military applications and will have clear impacts on national security, prevention of smuggling operations of nuclear materials, combating terrorism, and monitoring treaty compliance.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or other items that can be added to the listed items.

Upon studying the disclosure, it will be apparent to those skilled in the art that various modifications and variations can be made in the devices and methods of various embodiments of the invention. Other embodiments will be apparent to those skilled in the art from consideration of the specification and practice of the embodiments disclosed herein. It is intended that the specification and examples be considered as examples only. The various embodiments are not necessarily mutually exclusive, as some embodiments can be combined with one or more other embodiments to form new embodiments.

What is claimed is:

1. A method of detection of thermal neutrons, comprising irradiating Dy-containing material with thermal neutrons that causes transmutation of $^{164}$Dy into $^{165}$Ho and $^{166}$Er and determining relative fractions of Dy, Ho, and Er present from the transmutation.

2. The method of claim 1 wherein the relative fractions are determined based on differences in optical, extending into mid-infrared, properties of Dy, Ho, and Er.

3. The method of claim 2 wherein the relative fractions are determined by spectral analysis of the Dy-containing material.

4. The method of claim 3 wherein the optical/IR spectral analysis is conducted by a spectrofluorometer, or a Fourier transform infrared (FTIR) spectrometer.

5. The method of claim 1 wherein the Dy-containing material comprises nanocrystals.

6. The method of claim 1 wherein the Dy-containing material is selected from the group consisting of dysprosium halide, dysprosium oxide, and dysprosium aluminum garnet.

7. The method of claim 5 wherein the nanocrystals are irradiated while they reside in a transparent host.

8. The method of claim 7 wherein the host comprises a polymer or crystalline material, such as KBr or $BaF_2$, having the nanocrystals dispersed therein.

9. The method of claim 8 wherein the polymer or crystalline material is a layer or a three dimensional block.

10. The method of claim 1 wherein the Dy-containing material is a naturally occurring material without enrichment of $^{164}Dy$ isotope.

11. A sensor for detection of thermal neutrons, comprising Dy-containing material that when irradiated with thermal neutrons transmutes $^{164}Dy$ into $^{165}Ho$ and $^{166}Er$ such that relative fractions of Dy, Ho, and Er are indicative of thermal neutron exposure.

12. The sensor of claim 11 wherein the Dy-containing material comprises nanocrystals.

13. The sensor of claim 12 wherein the nanocrystals reside in a transparent host.

14. The sensor of claim 11 wherein the Dy-containing material is selected from the group consisting of dysprosium halide, dysprosium oxide, and dysprosium aluminum garnet.

15. The sensor of claim 13 wherein the host comprises a polymer or crystalline material, such as KBr or $BaF_2$, having the nanocrystals dispersed therein.

16. The sensor of claim 15 wherein the polymer or crystalline material is a layer or a three dimensional block.

17. The sensor of claim 11 wherein the Dy-containing material comprises naturally-occurring material without enrichment of $^{164}Dy$ isotope.

18. The sensor of claim 11 wherein the Dy-containing material is enriched in $^{164}Dy$ isotope.

19. A combination of a neutron sensor comprising Dy-containing material that when irradiated with thermal neutrons transmutes $^{164}Dy$ into $^{165}Ho$ and $^{166}Er$, and a detector to determine relative fractions of Dy, Ho, and Er in the Dy-containing material.

20. The combination of claim 19 wherein the detector embodies optical, extending into mid-infrared, detection.

21. The combination of claim 19 wherein the detector is a spectrofluorometer, spectrophotometer, or a Fourier transform infrared (FTIR) spectrometer.

22. The combination of claim 19 wherein the Dy-containing material comprises nanocrystals.

23. The combination of claim 22 wherein the nanocrystals reside in a transparent host.

24. The combination of claim 23 wherein the host comprises a polymer, glass, crystalline, or ceramic material, such as KBr or $BaF_2$.

* * * * *